United States Patent

Cebalo et al.

[15] 3,669,982

[45] June 13, 1972

[54] METHOD FOR PREPARING 1,3,4-THIADIAZOLE-2-YLUREAS

[72] Inventors: Tony Cebalo, Allentown; John Alderman, Alburtis, both of Pa.

[73] Assignee: Air Products and Chemicals, Inc., Allentown, Pa.

[22] Filed: Jan. 5, 1970

[21] Appl. No.: 830

[52] U.S. Cl. ..................................................260/306.8 D
[51] Int. Cl. .........................................................C07d 91/62
[58] Field of Search ..........................................260/306.8 D

[56] References Cited

UNITED STATES PATENTS 3,565,901　2/1971　Cebalo..............................260/306.8

*Primary Examiner*—Alex Mazel
*Assistant Examiner*—R. J. Gallagher
*Attorney*—David T. Nikaido and B. M. Klevit

[57] ABSTRACT

Certain 2-alkylamino-1,3,4-thiadiazole compounds are reacted with phosgene in the presence of boron trifluoride, the reaction product of which is subsequently reacted with a secondary amine to provide fully substituted 1,3,4-thiadiazol-2-ylurea compounds.

15 Claims, No Drawings

METHOD FOR PREPARING 1,3,4-THIADIAZOLE-2-YLUREAS

BACKGROUND OF THE INVENTION

It is known in the art to employ phosgene in methods for preparing urea compounds. For example, phosgene is reacted with a primary or secondary amine to produce intermediate carbamoyl chlorides which intermediates may be, in turn, reacted with other primary or secondary amines to produce urea compositions. However, the 2-alkylamino-1,3,4-thiadiazole intermediates which are needed to obtain the compounds of the invention will not react with phosgene in the normal manner. It has now been discovered that phosgene, under certain conditions, will react with these 2-alkylamino-1,3,4-thiadiazoles to provide an intermediate which when reacted with secondary amines gives the desired urea product.

SUMMARY OF THE INVENTION

The present invention is directed to a method for producing 1,3,4-thiadiazol-2ture:

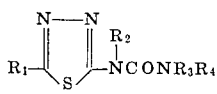

wherein $R_1$ is a lower alkyl radical having from one to four carbon atoms, a fluoroalkyl radical having from 1 to 4 carbon atoms or a chlorodifluoromethyl radical, $R_2$ is a lower alkyl radical having from one to four carbon atoms, $R_3$ is a lower alkyl radical having from one to four carbon atoms, alkoxy or cycloalkyl radical, and $R_4$ is a lower alkyl radical having from one to four carbon atoms, which comprises the steps of reacting phosgene, in the presence of a catalytic amount of boron trifluoride, with a 2-alkylamino-1,3,4-thiadiazole compound to obtain an intermediate thiadiazole derivative and subsequently reacting said derivative with a secondary amine to obtain 1,3,4-thiadiazol-2-ylurea compounds.

PREFERRED EMBODIMENTS OF THE INVENTION

The method of the invention may be represented by the following general reaction:

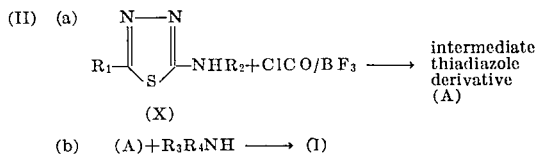

The definitions of $R_1$, $R_2$, $R_3$ and $R_4$ are as hereinbefore defined.

The 2-alkylamino-1,3,4-thiadiazole compounds (X) employed in (II) (a) above may be produced by methods generally known in the art. Examples of such methods are as follows:

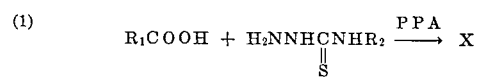

The above reaction uses polyphosphoric acid (PPA) as a dehydrating agent.

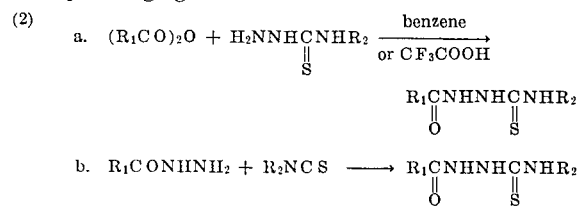

In each of the equations (1), (2) and (3), $R_1$ and $R_2$ are as defined above. Any of the above methods will yield the compound (X). For given substituents $R_1$ and $R_2$, each of the above methods will give a different yield. Selection of the preferred method, consequently, is an emperical decision based on experience with given substituents. Choice of method will be obvious to those skilled in the art, having the above disclosure before them.

Phosgene and boron trifluoride employed in the method are commercially available and any technical grade of each compound should provide desirable results. It has been found that beneficial reaction conditions are obtained in reaction (II) (a) above when the phosgene is employed in the presence of a boron trifluoride-ether complex catalyst. It is to be understood, however, that boron trifluoride without the ether complex will also produce desirable reaction conditions and resulting compositions.

Phosgene is present in the reaction in an amount from about 1 mole equivalent to about 4 mole equivalents, based on the 2-alkylamino-1,3,4-thiadiazole employed, and preferably from about 1 mole equivalent to 2 mole equivalents. The boron trifluoride is present in an amount from about 0.025 percent to about 10 percent by weight based on the amount of phosgene present and preferably from about 3 percent to about 7 percent by weight.

Although the exact structure of intermediate (A) is not known, it is significant to note that such intermediates will react with secondary amines, as in (II) (b) above, to give compounds of Structure (I). The prior art methods of using phosgene does not provide an intermediate that will react as in (II) (b) to give compounds of Structure (I).

The secondary amines that may be employed in the method of the invention include dimethylamine, methylpropylamine, dibutylamine, O,N-dimethylhydroxylamine, methylcyclohexylamine, dipropylamine and the like.

Reaction (II) (a) is normally conducted in the presence of an inert solvent such as benzene, toluene, xylene and the like. Such reaction is generally conducted at temperatures of from about 40° C to about 70° C and preferably from about 50° C to about 60° C.

Reaction (II) (b) is generally conducted at a temperature range of from about 0° C to about 40° C and preferably from about 20° C to about 30° C.

The method of the invention is particularly suited for preparing 1,3,4-thiadiazol-2-ylurea compounds having desirable biological activity, i.e. for use as herbicides, insecticides, fungicides, etc.

The following examples are illustrative of the invention and are not intended to limit the scope thereof.

EXAMPLE 1

To 122 gms of a solution of phosgene in 2,200 mls of anhydrous toluene was added 14 gms of boron trifluoride-ether complex. A dry ice condenser was used to prevent loss of the phosgene. To this solution was added, with stirring and at room temperature, 150 gms of 2-methylamino-5-trifluoromethyl-1,3,4-thiadiazole, the resulting mixture being heated to temperatures of from 50° C to 60° C for a period of 3 hours. The mixture was cooled in an ice bath to 15° C and subsequently dimethylamine was slowly bubbled through the reaction mixture until there was no evidence of an exothermic reaction. Temperature of the reaction during the addition of dimethylamine was maintained below 30° C. An insoluble material of dimethylamine hydrochloride was filtered off and the filtrate washed with 6N hydrochloric acid and water. The filtrate was dried over anhydrous sodium sulfate and subsequently concentrated under vacuum. The resulting product had a yield of 136 gms and was identified to be 1,1,3-trimethyl-3-(5-trifluoromethyl-1,3,4-thiadiazol-2-yl)urea.

EXAMPLE 2

To a solution of 54.5 gms of phosgene in 1,100 mls of anhydrous toluene was added 8 gms of boron trifluoride-ether complex. A dry ice condenser was employed to prevent loss of phosgene. To the solution was added 85.5 gms of 2-methylamino-5-pentafluoroethyl-1,3,4-thiadiazole, the mixture being heated to a temperature of 50° C to 60° C for a period of 3 hours. The resulting mixture was cooled in an ice bath to 15° C and dimethylamine was slowly bubbled through the mixture until there was no evidence of an exothermic reaction. The temperature was maintained below 30° C during addition of the dimethylamine. The insoluble material of dimethylamine hydrochloride was separated by filtration and the filtrate washed with 6N hydrochloric acid and water. The filtrate was subsequently dried over anhydrous sodium sulfate and concentrated under vacuum. The resulting product had a yield of 62 gms and was identified to be 1,1,3-trimethyl-3-(5-pentafluoroethyl-1,3,4-thiadiazol-2-yl)urea.

EXAMPLE 3

A. Intermediate (A) compounds were prepared in accordance with reaction II (a) above. Into a 1,000 ml. round bottom flask equipped with an addition tube, an addition funnel and dry ice condenser was added a mixture containing 500 ml of dry toluene, 38.4 gms of phosgene and 2 gms of boron trifluoride ether complex. To this mixture was added, dropwise and with stirring, 36.6 gms of 2-methylamino-5-trifluoromethyl-1,3,4-thiadiazole dissolved in 300 ml of dry toluene, such addition being made at room temperature. After complete addition of the thiadiazole mixture, the reaction temperature was raised to 50°-60° C and an additional 38.4 gms of phosgene were added. Nitrogen gas was bubbled through the reaction mixture until acid fumes could no longer be detected in the effluent gases. The resulting reaction mixture was subsequently washed with water and dried over sodium sulfate. Concentration of said mixture, under vacuum, yielded 38.8 grams of product (A). The product on crystallization from petroleum ether was found to have a melting point of 100° – 102° C.

B. To 2 gms of the intermediate product of A above was admixed 30 mls of an aqueous tetrahydrofuran (THF) solution (10 ml THF, 20 ml water) and to this mixture was added 0.5 gms of an aqueous solution of O,N-dimethylhydroxylamine hydrochloride which was neutralized with 0.6 grams of sodium carbonate. The reaction mixture was stirred for about 1 hour at room temperature and subsequently extracted with toluene. The toluene solution was washed with 6N hydrochloric acid, then with water and concentrated under vacuum to produce an oil product which was identified to be 1,3-dimethyl-1-methoxy-3-(5-trifluoromethyl-1,3,4-thiadiazol-2-yl)urea.

EXAMPLE 4

To a solution containing 243.3 gms of phosgene and 32.8 gms of boron trifluoride etherate in 1500 gms of toluene contained in a five liter, 3 necked flask, equipped with a stirrer and dry ice condenser was added, at room temperature, 328 gms 2-methylamino-5-chlorodifluoromethyl-1,3,4-thiadiazole. After complete addition of the thiadiazole, the reaction temperature was raised to, and maintained at 55° C for three hours. The reaction mixture was then cooled to less than 30° C and gaseous dimethylamine was bubbled through the reaction mixture while the temperature was maintained below 30° C, until no further exotherm was observed. The reaction mixture was washed with 6N hydrochloric acid and water. Removal of the toluene under vacuum yielded 330.6 gms of a product identified to be 1,1,3-trimethyl-3-(5-chlorodifluoromethyl-1,3,4-thiadiazol-2-yl)urea and having a melting point of 50° – 52° C.

In place of the particular 2-alkylamino-1,3,4-thiadiazole and secondary amine compounds employed in the Examples, other compounds as hereinbefore described, may be substituted to obtain substantially the same results.

What is claimed is:

1. A method for producing 1,3,4-thiadiazol-2-ylurea compounds which comprises (a) reacting a 2-alkylamino-1,3,4-thiadiazole compound with phosgene, in the presence of an inert solvent and a catalytic amount of boron trifluoride, and (b) reacting the resulting reaction product with a secondary amine.

2. The method of claim 1 wherein the boron trifluoride is present in an amount from about 0.025 percent to about 10 percent by weight based on the total weight of the phosgene.

3. The method of claim 1 wherein the secondary amine is dimethylamine.

4. The method of claim 1 wherein the secondary amine is O,N-dimethylhydroxylamine hydrochloride.

5. The method of claim 1 wherein the phosgene is present in the reaction mixture in an amount from about 1 mole equivalent to about 4 mole equivalents based on the 2-alkylamino-1,3,4-thiadiazole employed.

6. The method of claim 1 wherein part (a) of the reaction is conducted at a temperature in the range of from about 40° C to about 70° C and part (b) is conducted at a temperature in the range of from about 0° C to about 40° C.

7. A method for producing compounds having the general structure:

$$R_1 \underset{S}{\overset{N-N}{\bigvee}} \underset{NCONR_3R_4}{\overset{R_2}{\bigg|}}$$

wherein

R$_1$ is a lower alkyl radical having from one to four carbon atoms, a fluoroalkyl radical having from one to four carbon atoms or a chlorodifluoromethyl radical, R$_2$ is a lower alkyl radical having from one to four carbon atoms, R$_3$ is a lower alkyl radical having from one to four carbon atoms, methoxy or cyclohexyl radical, and R$_4$ is a lower alkyl radical having from one to four carbon atoms, which comprises the steps of reacting phosgene, in the presence of an inert solvent and a catalytic amount of boron trifluoride, with a 2-alkylamino-1,3,4-thiadiazole compound to obtain an intermediate thiadiazole derivative and subsequently reacting said derivative with a secondary amine.

8. The method of claim 7 wherein the secondary amine is dimethylamine.

9. The method of claim 7 wherein the secondary amine is O,N-dimethylhydroxylamine hydrochloride.

10. The method of claim 7 wherein the phosgene is present in an amount from about 1 mole equivalent to about 4 mole equivalents based on the 2-alkylamino-1,3,4-thiadiazole employed.

11. The method of claim 7 wherein the boron trifluoride is present in an amount from about 0.025 percent to about 10 percent by weight based on the total weight of phosgene.

12. The method of claim 7 wherein R$_1$ is trifluoromethyl and R$_2$, R$_3$ and R$_4$ are methyl.

13. The method of claim 7 wherein R$_1$ is pentafluoroethyl and R$_2$, R$_3$ and R$_4$ are methyl.

14. The method of claim 7 wherein R$_1$ is trifluoromethyl, R$_2$ is methyl, R$_3$ is methoxy and R$_4$ is methyl.

15. The method of claim 7 wherein R$_1$ is chlorodifluoromethyl and R$_2$, R$_3$ and R$_4$ are methyl.

* * * * *